United States Patent
Dominici et al.

(10) Patent No.: US 9,569,893 B2
(45) Date of Patent: Feb. 14, 2017

(54) HYBRID DISPLAY SYSTEM DISPLAYING INFORMATION BY SUPERIMPOSITION ON THE EXTERIOR

(71) Applicant: THALES, Neuilly sur Seine (FR)

(72) Inventors: Johanna Dominici, Eysines (FR); Sebastien Ellero, Francescas (FR); Christophe Coupeaud, St Medard en Jalle (FR)

(73) Assignee: Thales, Neuilly sur Seine (FR)

( * ) Notice: Subject to any disclaimer, the term of this patent is extended or adjusted under 35 U.S.C. 154(b) by 157 days.

(21) Appl. No.: 14/255,890

(22) Filed: Apr. 17, 2014

(65) Prior Publication Data
US 2014/0313189 A1 Oct. 23, 2014

(30) Foreign Application Priority Data
Apr. 19, 2013 (FR) ...................... 13 00928

(51) Int. Cl.
| | |
|---|---|
| *G06T 15/00* | (2011.01) |
| *G06T 19/00* | (2011.01) |
| *G09G 5/02* | (2006.01) |
| *G02B 27/01* | (2006.01) |

(52) U.S. Cl.
CPC .............. *G06T 19/006* (2013.01); *G02B 27/01* (2013.01); *G09G 5/02* (2013.01); *G02B 2027/0112* (2013.01); *G02B 2027/0118* (2013.01); *G02B 2027/0134* (2013.01)

(58) Field of Classification Search
None
See application file for complete search history.

(56) References Cited

U.S. PATENT DOCUMENTS

| 4,028,725 A | 6/1977 | Lewis | |
|---|---|---|---|
| 5,973,656 A * | 10/1999 | Yokoi | G02B 26/105 345/7 |

(Continued)

FOREIGN PATENT DOCUMENTS

| WO | WO 2007/106092 A1 | 9/2007 |
|---|---|---|
| WO | WO 2010/103955 A1 | 9/2010 |

*Primary Examiner* — Anh-Tuan V Nguyen
(74) *Attorney, Agent, or Firm* — Blakely, Sokoloff, Taylor & Zafman LLP

(57) ABSTRACT

The general field of the invention is that of Instrument panel or cockpit display systems. The system according to the invention comprises:
- a first display device comprising a semi-transparent screen upon which a first image is displayed;
- a second mobile display device mounted on a helmet or augmented reality glasses, the said second device comprising means of displaying a second image collimated in a predetermined visual field;
- a detection of the orientation and of the position of the helmet in a predetermined reference system;
- first means making it possible to determine the zone of intersection of the predetermined visual field with the semi-transparent screen;
- second means making it possible to display in the said zone of intersection of the semi-transparent screen a first specific image, and/or to display in the second display device a second specific image, which are functions of the first image and of the second image.

12 Claims, 4 Drawing Sheets

(56) References Cited

U.S. PATENT DOCUMENTS

| | | | | |
|---|---|---|---|---|
| 6,222,675 B1* | 4/2001 | Mall | G02B 27/017 | 345/7 |
| 6,611,242 B1* | 8/2003 | Hongo | G02B 27/017 | 345/2.1 |
| 7,095,562 B1* | 8/2006 | Peng | G02B 27/0101 | 345/7 |
| 7,180,476 B1* | 2/2007 | Guell | G01S 19/15 | 340/980 |
| 7,928,927 B1* | 4/2011 | Krenz | G02B 27/017 | 345/633 |
| 7,982,959 B1* | 7/2011 | Lvovskiy | G02B 27/01 | 348/115 |
| 8,336,777 B1* | 12/2012 | Pantuso | G02B 27/017 | 235/404 |
| 8,576,276 B2 | 11/2013 | Bar-Zeev et al. | | |
| 8,681,073 B1* | 3/2014 | Robbins | H04N 21/4318 | 345/7 |
| 8,912,979 B1* | 12/2014 | Gomez | G09G 3/001 | 345/7 |
| 2002/0051001 A1* | 5/2002 | Kanai | H04N 9/73 | 345/591 |
| 2002/0154349 A1* | 10/2002 | Halldorsson | B60K 35/00 | 359/15 |
| 2004/0169617 A1* | 9/2004 | Yelton | G06T 15/10 | 345/1.1 |
| 2005/0046953 A1* | 3/2005 | Repetto | G02B 27/017 | 359/630 |
| 2007/0188417 A1* | 8/2007 | Hajjar | G02B 26/101 | 345/75.1 |
| 2008/0143639 A1* | 6/2008 | Gerbe | G02B 27/0172 | 345/8 |
| 2009/0005961 A1* | 1/2009 | Grabowski | G01C 21/365 | 701/532 |
| 2009/0309812 A1* | 12/2009 | Larson | G02B 27/017 | 345/8 |
| 2010/0001928 A1* | 1/2010 | Nutaro | G02B 27/017 | 345/8 |
| 2010/0020117 A1* | 1/2010 | Tanizoe | G09G 5/005 | 345/690 |
| 2010/0207843 A1* | 8/2010 | Coloma | G02B 27/01 | 345/1.1 |
| 2011/0255174 A1* | 10/2011 | Bignolles | G02B 27/0101 | 359/632 |
| 2012/0001955 A1* | 1/2012 | Yamazaki | G09G 3/3688 | 345/690 |
| 2012/0017147 A1* | 1/2012 | Mark | G06F 1/1639 | 715/702 |
| 2012/0105310 A1* | 5/2012 | Sverdrup | G02B 27/017 | 345/8 |
| 2012/0127284 A1 | 5/2012 | Bar-Zeev et al. | | |
| 2013/0083082 A1* | 4/2013 | Bukesov | C09K 11/7734 | 345/690 |
| 2013/0127725 A1* | 5/2013 | Sugimoto | G06F 3/02 | 345/168 |
| 2013/0328754 A1* | 12/2013 | Lai | G09G 3/32 | 345/82 |
| 2014/0098088 A1* | 4/2014 | Ryu | G06F 3/011 | 345/419 |
| 2014/0111864 A1* | 4/2014 | Margulis | G02B 27/0172 | 359/630 |
| 2014/0267402 A1* | 9/2014 | Hing | G02B 27/01 | 345/633 |

* cited by examiner

HYBRID DISPLAY SYSTEM DISPLAYING INFORMATION BY SUPERIMPOSITION ON THE EXTERIOR

BACKGROUND OF THE INVENTION

1. Field of the Invention

The field of the invention is that of vehicle instrument panel or cockpit display systems. The invention especially applies to the field of civil or military aircraft. It can also apply to road, sea or rail transport means.

2. Description of the Prior Art

At present, the instrument panels of the cockpits of modern aircraft comprise display screens and instruments over the majority or their area, thus reducing the direct vision of the external scene in the bottom zone of the cockpit. In a certain number of applications, including visual flight at low altitude, this absence of direct vision can be annoying.

A simple first solution consists in the pilot contorting himself in order to see above display screens, when this is possible.

A second solution consists in using collimated display systems, also called "See Through" systems. These essentially comprise two large families which are the helmet-mounted displays worn on the pilot's head and so-called "Head-Up Display" devices permanently fitted in the cockpit. These devices superimpose information in the form of images or symbols on the external scene.

These latter equipments have the feature of being collimated, that is to say that the items of information coming from a display device are projected "to infinity" by means of suitable optics. The pilot does not therefore need to focus on either the information or the scene, both being clearly seen simultaneously. These equipments have a certain technical complexity and are therefore of high cost. Moreover, the information is presented specifically so as not to mask the scene in the background, which involves a representation different from that of the so-called "Head-down" screens. The pilot must therefore put a certain amount of effort into going between his "head-up" and "head-down" screens in order to find his landmarks.

A third solution consists in using semi-transparent display screens placed in the user's field of vision and which make it possible to project an image superimposed on the external scene. The advantage of these screens is that it is possible to obtain large display areas visible in a large field of vision at costs that are lower than those of collimated systems. The principal disadvantage of these screens is that the image is not collimated, which can give rise to problems of parallax and accommodation.

SUMMARY OF THE INVENTION

The system according to the invention consists in coupling a collimated display device mounted on the pilot's head, having a small field of vision with a transparent non-collimated display device having a large field of vision. The assembly is associated with a system for Detecting the Position (PDS—Position Detection System) of the pilot's head and/or his viewing direction in order to be able to correlate the two systems as a function of the position of the pilot's head and/or of his viewing direction.

This assembly allows the pilot to have, within his primary field of vision, piloting and navigation information superimposed on the scene by means of a small-sized and inexpensive device whilst having other items of information displayed in a large field and a large eye box and retaining good visibility of the external scene.

More precisely, the invention relates to an instrument panel or cockpit display system comprising:

a first display device fixed in a predetermined reference system, the said first display device comprising a semi-transparent screen upon which a first image is displayed;

a second display device intended to be worn on the head of a user, the said second device comprising means of displaying in the field of vision of the said user a second image collimated in a predetermined visual field;

a detection of the orientation and of the position of the said second display device in the said predetermined reference system;

characterized in that the system comprises first means making it possible to determine the zone of intersection of the predetermined visual field with the semi-transparent screen and second means making it possible to display in the said zone of intersection of the semi-transparent screen a first specific image, which is a function of the first image and of the second image and/or to display in the second display device a second specific image, which is a function of the first image and of the second image.

Advantageously, the first specific image does not comprise any information, so that the second image alone is visible in the zone of intersection.

Advantageously, the items of information in the first image presented on the semi-transparent screen in the zone of intersection are distributed on the semi-transparent screen outside of the said zone of intersection.

Advantageously, the items of information in the first image presented on the semi-transparent screen in the zone of intersection are displayed only in the second specific image.

Advantageously, the second specific image does not comprise any information, so that the first image alone is visible in the zone of intersection.

Advantageously, the first display device displays a stereoscopic image on the semi-transparent screen and the second display device is binocular and comprises means of selection of stereoscopic images transmitted by the first display device.

Advantageously, the second display device is a helmet-mounted display or augmented reality glasses.

Advantageously, the system comprises means making it possible to determine the position variations of the semi-transparent screen and to servo-control the first image such that it is stable in the predetermined reference system.

Advantageously, the semi-transparent display screen comprises at least one photosensitive sensor measuring the photometric and/or colorimetric characteristics of the external environment and means linked to the said sensor making it possible to servo-control the brightness and/or the colourimetry of the first image as a function of the said photometric and/or colorimetric characteristics.

Advantageously, the second display device comprises at least one second photosensitive sensor intended to measure the photometric and/or colorimetric characteristics of the external environment seen by the user's eyes and means linked to the said second photosensitive sensor making it possible to servo-control the brightness and/or the colourimetry of the second image as a function of the said photometric and/or colorimetric characteristics.

Advantageously, the display system is an aircraft cockpit or instrument panel system.

BRIEF DESCRIPTION OF THE DRAWINGS

The invention will be better understood and other advantages will become apparent on reading the following description given in a non-limiting way and with reference to the appended figures among which.

DETAILED DESCRIPTION

Figure 1:
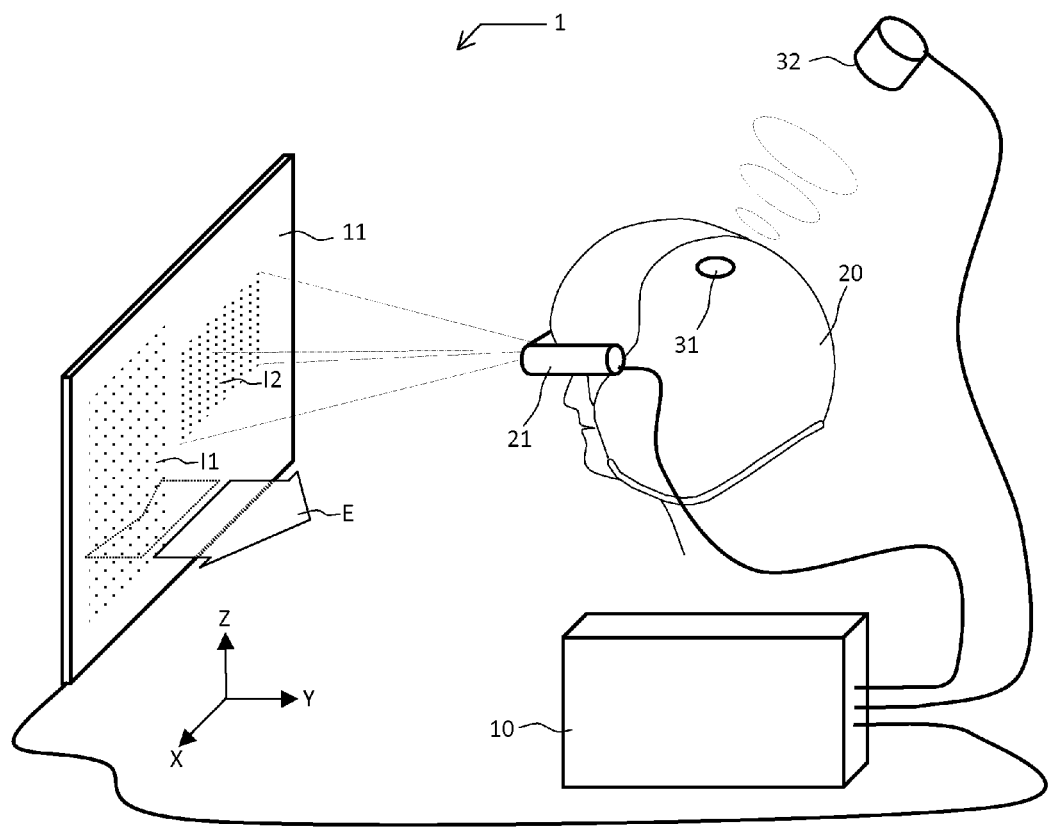
FIG. 1 is a general block diagram of a display system according to the invention.

By way of non-limiting example, FIG. 1 shows a general block diagram of a display system 1 according to the invention in the context of an aeronautical application. The system is integrated in the cockpit of an aircraft. It essentially comprises:
- a first display device fixed in a predetermined reference system (X, Y, Z), the said first display device comprising a semi-transparent screen 11 on which is displayed a first image I1 symbolized by dotted lines in FIG. 1. This first device is seen by a user in a wide angle of view of the order of several tens of degrees. The system can comprise several display devices disposed in line in order to form the instrument panel of the aircraft;
- a second display device 21 mounted on a helmet 20 and worn on the head of the user. This second device comprises means of displaying in the field of vision of the said user a second collimated image in a predetermined visual field. This field has smaller dimensions than the previous one. These angular dimensions are included between a few degrees and fifty degrees. For applications not necessitating a helmet, the second display device can also be a pair of augmented reality glasses, that is to say glasses comprising integrated display means making it possible to present a collimated image in the field of vision of the wearer of the said glasses;
- a detection of the orientation and of the position of the helmet in the predetermined reference system. Conventionally, helmet detection comprises a first subassembly 31 referred to the helmet and a second subassembly 32 referred to the reference system (X, Y, Z);
- an assembly of electronic means represented by the computer 10. This assembly of means is not necessarily centralized in a single computer. This assembly groups the following means:
    - Generation of the images for the first display device and the second display device;
    - Control of the detection of helmet position and calculation of the position and of the orientation of the helmet in space;
    - Determination of the zone of intersection of the predetermined field of vision with the semi-transparent screen;
    - Generation in the zone of intersection of the semi-transparent screen of a first specific image that is a function of the first image and of the second image and/or generation in the second display device of a second specific image, which is also a function of the first image and of the second image.

This FIG. 1 also represents the transmission of the external scene E though the semi-transparent screen 11 by a wide arrow. The image I1 projected on this screen 11 is also represented by a first rectangle of dotted lines and the virtual projection of the collimated image I2 by the second display device 21 is also represented by a second rectangle of dotted lines.

Many technologies are used for producing a semi-transparent screen 11 having a wide field and a large eye box. It is possible, for example, to project the image on a PDCL (Polymer Dispersed Liquid Crystal) film or on a passive screen comprising dispersing etched patterns whose distribution is a function of the desired transparency. It is also possible to use an active matrix screen of the LCD (Liquid Crystal Display) or OLED (Organic Light Electroluminescent Diode) type.

In a variant configuration, this semi-transparent screen 11 can be a "3D" or stereoscopic display screen. It is known that this technology consists in sending images dedicated to the right eye of the user and images dedicated to his left eye. The discrimination of the images can be carried out sequentially over time or by spatial separation means, such as polarization. In this case, the polarizers or the electronic shutters synchronized with the projected images can be integrated in the collimated display device already mounted on the pilot's head.

There are diverse technologies for producing the second small-field collimated display device 21 mounted on the helmet. It is possible, by way of non-limiting example, to use:
- a device projecting images on a standard visor, or;
- an optical assembly comprising an optical mixer of the aperture expander type constituted by a light guide comprising integrated semi-reflective plates, or again;
- holograms or diffraction gratings.

It is also possible to use augmented reality glasses.

The display device can be monocular, bi-ocular or bin-ocular. In the latter case, each eye sees a different visual field with a common central section.

If the transparent screen is passive and comprises an image projector, the projection system and the screen are coupled in order to limit the vibrations which can be large in an aeronautical environment. Either the two subassemblies are physically bound or an accelerometer positioned on each subassembly makes it possible to servo-control the position of the screen and the projected image, or the projector sends a test pattern to the screen-holding system which comprises a pair of photosensitive sensors. More information on this latter servo-control technique will be found in the patent FR 2 959 023 entitled "Servo-controlled multi-projector display system". These sensors can furthermore be used for servo-controlling the brightness of the projector as a function of the ambient and/or exterior brightness and can also check other characteristics of the projectors such as the colourimetry or the fixed images.

This type of photosensitive sensor can also be mounted on or in the vicinity of the second display device in order to measure the photometric and/or colorimetric characteristics of the external environment seen by the user's eyes. Means linked to the said second photosensitive sensor make it possible to servo-control the brightness and/or the colorimetry of the second image as a function of the said photometric et/or colorimetric characteristics.

Optionally, the screen can become interactive whilst retaining its transparency, for example using an optical, resistive and/or capacitive touch-sensitive technology.

There are various techniques making it possible to locate an object in space. It is possible, for example, to use electromagnetic detection. A transmitter is placed on the fixed reference system and a receiver is placed in the mobile reference system. It is also possible to use optical detection, which can be passive or active. In the latter case, the helmet carries light emitting diodes of which the position of transmission is located by cameras. Advantageously the system can use a hybrid position detection system combining several methods and/or using MEMS (Micro-Electro-Mechanical-System) inertial sensors coupled to an inertial system. All of these techniques are known to those skilled in the art. They are compatible with real time operation and are easily adapted to the display system according to the invention.

FIGS. 2 to 6 represent the abovementioned semi-transparent screen 11. On this screen there is displayed an image I1 symbolically represented by a series of rectangles in FIGS. 2 to 6. This image can comprise symbols and/or a video image. This semi-transparent screen allows the external scene to pass through E so that it is seen due to semi-transparency.

Onto these different figures has been added the zone of intersection of the collimated image I2, given by the second display system, and the semi-transparent screen. This zone has been referenced $I_{12}$.

Figure 2:
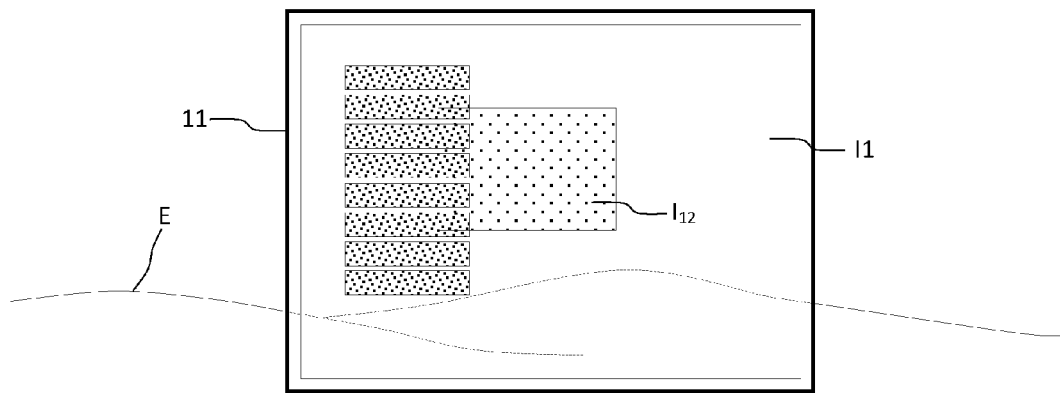
FIGS. 2 to 6 show different possible ways of presenting images in a display system according to the invention.

This zone can of course comprise the image I1 and the image I2 given by the collimated display device without there being interactions between the two display devices. There is therefore simple superimposition of the two images in the visual field of the user. This is illustrated in FIG. 2.

Figure 3:
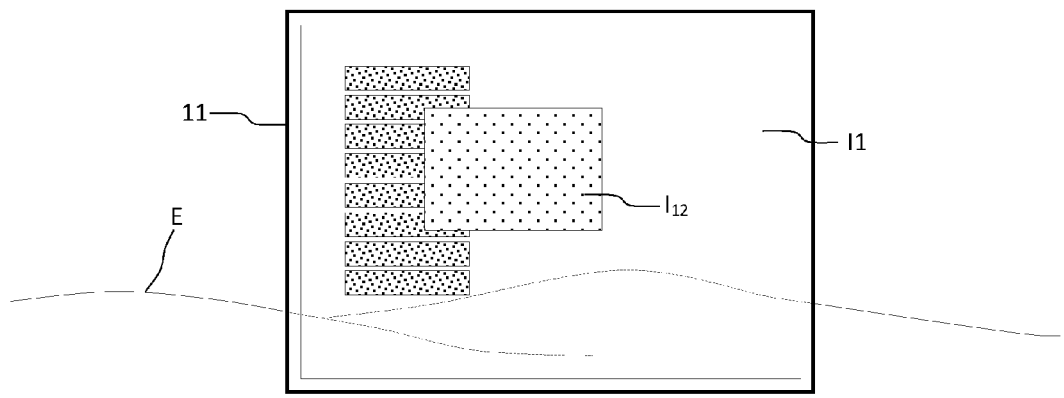

In a second operating mode, priority is given to the image given by the second display device. In this case, the electronic control means delete the content of the part of the image I1 contained in the zone of intersection. This is illustrated in FIG. 3. The part of the rectangles shown in FIG. 2 that belong to the zone $I_{12}$ is no longer displayed.

Figure 4:
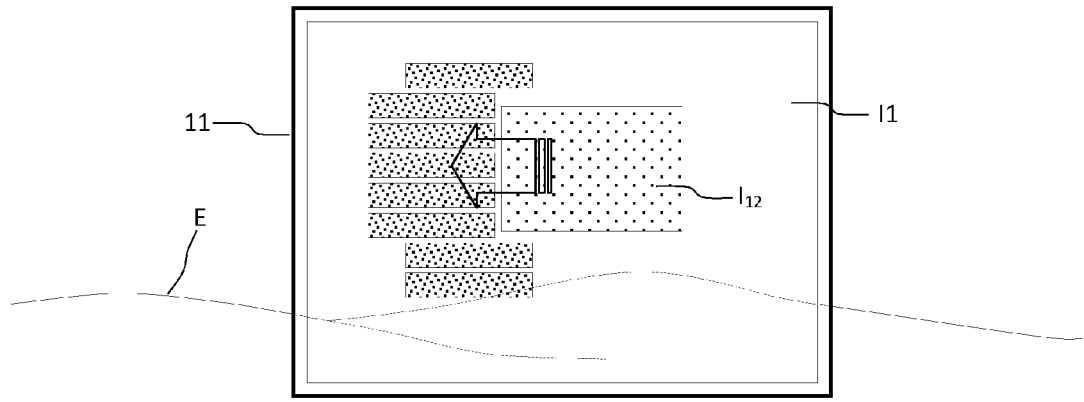

In a third operating mode which is a variant of the preceding mode, the items of information contained in the zone of intersection are simply shifted on the semi-transparent screen. This is illustrated in FIG. 4. The rectangles shown in FIG. 2 belonging to the zone $I_{12}$ are shifted. It is of course possible to use other arrangements such as reducing the size of the items of information or deleting the non-essential items of information.

Figure 5:
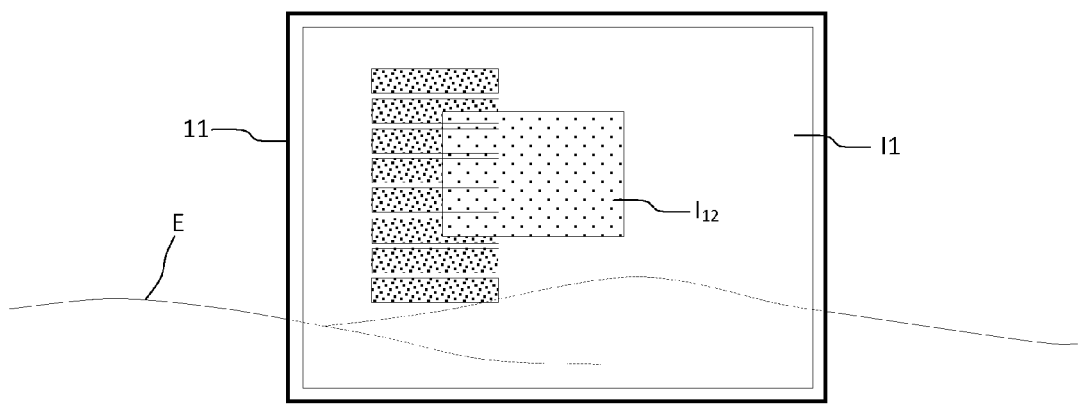

In a fourth operating mode, the items of information contained in the zone of intersection and belonging to the image I1 are transferred into the second display system and displayed in the image I2. Thus, instead of being seen at a finite distance in the plane of the semi-transparent screen, they are seen at infinity. This is illustrated in FIG. 5. It is also possible to do the reverse. That is to say to display on the semi-transparent screen an image I1 that comprises, in the zone $I_{12}$, the image I2 of the second display device. In this case the totality of the image is at a finite distance.

Figure 6:
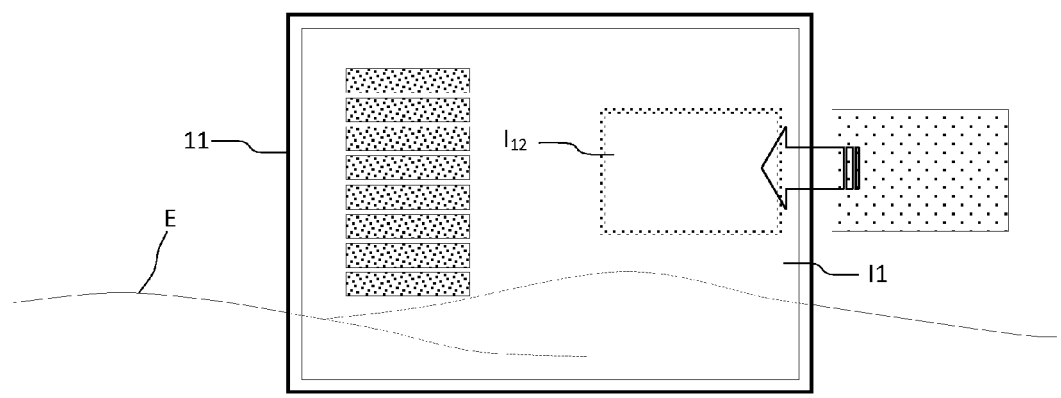

Finally, in a fifth embodiment, the image I2 of the second display device can simply be switched off when it penetrates into the field of the semi-transparent screen. This is illustrated in FIG. 6.

What is claimed is:

1. An instrument panel or cockpit display system comprising:
    a first display device fixed in a predetermined reference system, the first display device comprising a semi-transparent screen upon which a first image is displayed, the first display device being seen by a user in a wide angle of view of an order of several tens of degrees;
    a second display device intended to be worn on the head of the user, the second display device generates a display of a field of vision of the user a second image collimated in a predetermined visual field, whose dimensions are included between a few degrees and fifty degrees;
    a detection of the orientation and of the position of the second display device in the predetermined reference system;
    wherein the system determines the zone of intersection of the predetermined visual field with the semi-transparent screen and adjusts items of information of the first image in the zone of intersection, the adjustment comprising one or more of the removal in the zone of intersection, of the shifting out of the zone of intersection, or of the transfer in of the second image of the second display device, the adjustment being performed on the first display device.

2. The instrument panel or cockpit display system according to claim 1, wherein the second image alone is visible in the zone of intersection.

3. The instrument panel or cockpit display system according to claim 2, wherein the items of information in the first image presented on the semi-transparent screen in the zone of intersection are distributed on the semi-transparent screen outside of the zone of intersection.

4. The instrument panel or cockpit display system according to claim 2, wherein the items of information in the first image presented on the semi-transparent screen in the zone of intersection are displayed only in the second image and not displayed in the first image.

5. The instrument panel or cockpit display system according to claim 1, wherein the first display device displays a stereoscopic image on the semi-transparent screen.

6. The instrument panel or cockpit display system according to claim 5, wherein second display device is binocular and selects stereoscopic images transmitted by the first display device.

7. The instrument panel or cockpit display system according to claim 1, wherein the second display device is a helmet-mounted display or augmented reality glasses.

8. The instrument panel or cockpit display system according to claim 1, wherein the system determines the position variations of the semi-transparent screen and servo-controls the first image such that it is stable in the predetermined reference system.

9. The instrument panel or cockpit display system according to claim 1, wherein the semi-transparent display screen comprises at least a first photosensitive sensor measuring the photometric and/or colorimetric characteristics of the external environment, and wherein the system servo-controls the brightness and/or the colourimetry of the first image as a function of the first photometric and/or colorimetric characteristics.

10. The instrument panel or cockpit display system according to claim 1, wherein the second display device comprises at least one second photosensitive sensor intended to measure the photometric and/or colorimetric characteristics of the external environment seen by the user's eyes, and wherein the system servo-controls the brightness and/or the colourimetry of the second image as a function of the photometric and/or colorimetric characteristics.

11. The instrument panel or cockpit display system according to claim 1, wherein the display system is an aircraft cockpit or instrument panel system.

12. The instrument panel or cockpit display system according to claim 1, wherein the first display device comprises a semi-transparent, non-collimated screen and the second display device comprises a collimated display device.

* * * * *